(12) United States Patent
Oh et al.

(10) Patent No.: US 7,333,272 B2
(45) Date of Patent: Feb. 19, 2008

(54) VARIABLE-FOCUS LENS AND FABRICATION METHOD THEREOF

(75) Inventors: Byung Do Oh, Kyungki-do (KR); Sang Kug Chung, Seoul (KR); Young Gi Kim, Kyungki-do (KR); Jae Young Bae, Kyungki-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/433,349

(22) Filed: May 15, 2006

(65) Prior Publication Data

US 2006/0256448 A1    Nov. 16, 2006

(30) Foreign Application Priority Data

May 16, 2005    (KR) ..................... 10-2005-0040874

(51) Int. Cl.
*G02B 3/12*    (2006.01)
(52) U.S. Cl. ...................... 359/666; 359/665
(58) Field of Classification Search ............... 359/665, 359/666

See application file for complete search history.

(56) References Cited

FOREIGN PATENT DOCUMENTS

| EP | 1 345 055 A2 | 9/2003 |
|---|---|---|
| JP | 2002-162506 | 6/2002 |
| JP | 2002162506 A * | 6/2002 |
| WO | WO 03/069380 A1 | 8/2003 |

OTHER PUBLICATIONS

European Search Report, dated Jul. 18, 2006.

* cited by examiner

*Primary Examiner*—Ricky Mack
*Assistant Examiner*—William C Choi

(57) ABSTRACT

The present invention relates to a variable focus lens. The variable focus lens comprises a fluid chamber having a protrusion formed along one opened end thereof. The fluid chamber is cylindrically shaped to house first and second non-miscible fluids therein, and the first and second fluids have different refractive indices. A transparent element hermetically is coupled with the opened end of the chamber with a predetermined gap from the protrusion of the chamber. A first electrode is disposed inside the chamber to act on the first fluid, and a second electrode is insulated from the first electrode. The variable focus lens can be easily fabricated to prevent bubble formation with the protrusion formed at the opened end of the chamber.

4 Claims, 11 Drawing Sheets

VARIABLE-FOCUS LENS AND FABRICATION METHOD THEREOF

RELATED APPLICATION

The present application is based on and claims priority from Korean Application Number 10-2005-0040874, filed May 16, 2005, the disclosure of which is hereby incorporated by reference herein in its entirety.

BACKGROUND OF THE INVENTION

1. Field of the Invention

The present invention relates to a variable focus lens, more particularly, which can be easily fabricated to prevent bubble formation with a protrusion formed at an opened end of a chamber.

2. Description of the Related Art

In general, a camera is equipped with a plurality of lenses, and designed to drive the lenses respectively in order to vary relative distances thereof, thereby adjusting its optical focal length. Owing to the miniaturization of optical devices such as a camera, demand for the miniaturization of a lens equipped therein is also on the rise.

As an approach to meet the miniaturization demand, a variable focus lens disclosed in WO 03/069380 was proposed.

FIG. 1 is a schematic cross-sectional view of a variable focus lens proposed as an embodiment of WO 03/069380.

As shown in FIG. 1, the variable focus lens includes a fluid chamber 5 having a cylinder wall to contain non-miscible first and second fluids A and B therein and a fluid contact layer 10 arranged on the inside of the cylinder wall. The first and second fluids A and B are in contact over a meniscus 14 and have different refractive indices. The variable focus lens also includes a first electrode 2 separated from the first and second fluids A and B by the fluid contact layer 10 and a second electrode 12 acting on the second fluid.

The first electrode 2 is a cylinder in shaped, formed from a metallic material, and coated by an insulating layer 8. The second electrode 12 is arranged at one end of the fluid chamber 5.

The fluid chamber 5 is covered or sealed by transparent front and back elements 4 and 6 to contain the first and second fluids A and B.

A sealing (shown in FIG. 4 and given with reference number 16) is also provided to hermetically couple the transparent front element 4 with the fluid contact layer 10.

The variable focus lens of this construction will operate as follows.

When no voltage is applied between the first electrode 2 and the second electrode 12, the fluid contact layer 10 has a higher wettablity with respect to the first fluid A than the second fluid B.

Due to electro-wetting, the wettability by the second fluid B varies under the application of a voltage between the first and second electrodes 2 and 12, which tends to change the contact angle of the meniscus 10 as indicated with Q1, Q2 and Q3.

The shape of the meniscus is thus variable in dependence on the applied voltage, which in turn achieves focus adjustment of the lens.

That is, as shown in FIGS. 1 to 3, according to the magnitude of the voltage applied, the angle of the meniscus 14 and the fluid contact layer 10 measured in the side of the first fluid B changes from an obtuse angle to an acute angle gradually, for example, in the order of 140, 100° and 60°.

Herein, FIG. 1 shows a lens configuration when lower voltage is applied, FIG. 2 shows a lens configuration where intermediate power is applied, and FIG. 3 shows a lens configuration where high voltage is applied.

The advantage of the aforementioned variable focus lens adopting fluid is that its size can be further reduced than a mechanical lens system that adjusts focal length through mechanical actuation of lenses.

However, the conventional variable focus lens has drawbacks as illustrated in FIG. 4. As the variable focus lens contains fluids, if the fluids are not properly sealed, bubbles or voids 18 may be built up inside the chamber 5 as shown in FIG. 4.

In order to prevent it, the lens may be assembled in the fluid. However, even this does not completely prevent bubble built-up but degrades workability thereby hindering mass production.

SUMMARY OF THE INVENTION

The present invention has been made to solve the foregoing problems of the prior art and it is therefore an object of the present invention to provide a variable focus lens having a protrusion formed at one end of a chamber to prevent defect or deterioration owing to bubbles.

It is another object of the invention to provide a variable focus lens having a protrusion formed at one end of a chamber for facilitating its fabrication in the air, thereby remarkably improving productivity.

According to an aspect of the invention for realizing the foregoing objects, the invention provides a variable focus lens comprising: a fluid chamber having a protrusion formed along one opened end thereof, the fluid chamber cylindrically shaped to house first and second non-miscible fluids therein, the first and second fluids having different refractive indices; a transparent element hermetically coupled with the opened end of the chamber with a predetermined gap from the protrusion of the chamber; a first electrode disposed inside the chamber to act on the first fluid; and a second electrode insulated from the first electrode.

Preferably, the chamber is made of transparent material, and has a closed end with a predetermined thickness opposed to the opened end.

Preferably, the first fluid is conductive and the second fluid is non-conductive.

Preferably, the protrusion has a sharp tip, in which the tip of the protrusion has a width of 300 µm or less.

In addition, the variable focus lens may further comprise a second transparent element hermetically coupled to the other end of the chamber.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The present invention will now be described more fully hereinafter with reference to the accompanying drawings, in which preferred embodiments of the invention are shown.

Figure 5:
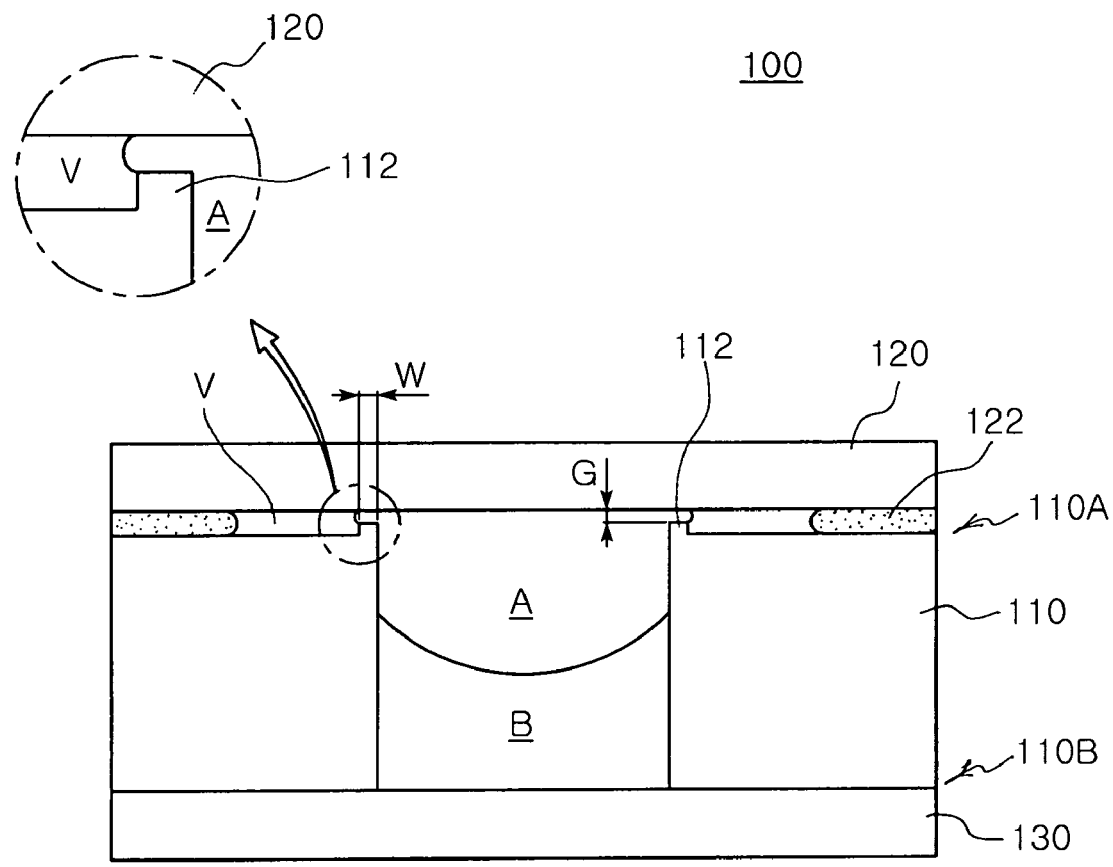
FIG. 5 is a sectional view schematically illustrating a variable focus lens according to an embodiment of the invention.

First, with reference to FIG. 5, a variable focus lens 100 according to an embodiment of the invention is schematically shown.

The variable focus lens 100 of the invention includes a chamber wall 110 cylindrically shaped to form a space therein. The chamber wall 110 has a bump or protrusion 112 formed along an upper end 110A thereof. The variable focus lens 100 further includes an upper transparent element 120 coupled with the upper end 110A of the chamber wall 110 with a predetermined gap G from the protrusion 112 and a lower transparent element 130 coupled with a lower end 110B of the chamber wall 110. The upper transparent element 120 and the chamber wall 110 are hermetically coupled by a sealing 122, and the lower transparent element 130 and the chamber wall 110 are coupled together by a bonding layer (not shown). The bonding may be performed by for example frit bonding.

The inner space of the chamber defined by the chamber wall 110 and the upper and lower transparent elements 120 and 130 is filled with first and second non-miscible fluids A and B. The first and second fluids A and B have a substantially equal density, but different refractive indices. Furthermore, one of the fluids is conductive but the other one is non-conductive. In general, the first fluid A is conductive whereas the second fluid B is non-conductive.

In this construction, the first fluid A forms a convex, dew-like portion bulged from between the protrusion 112 and the upper transparent element 120 but maintains tight or close contact with the upper transparent element 120 inside the protrusion 112. As a result, air or gas maintains in an area outside the protrusion 112, that is, a vacancy V between the protrusion 112 and the sealing 122, but not inside the protrusion 112.

Figure 6:
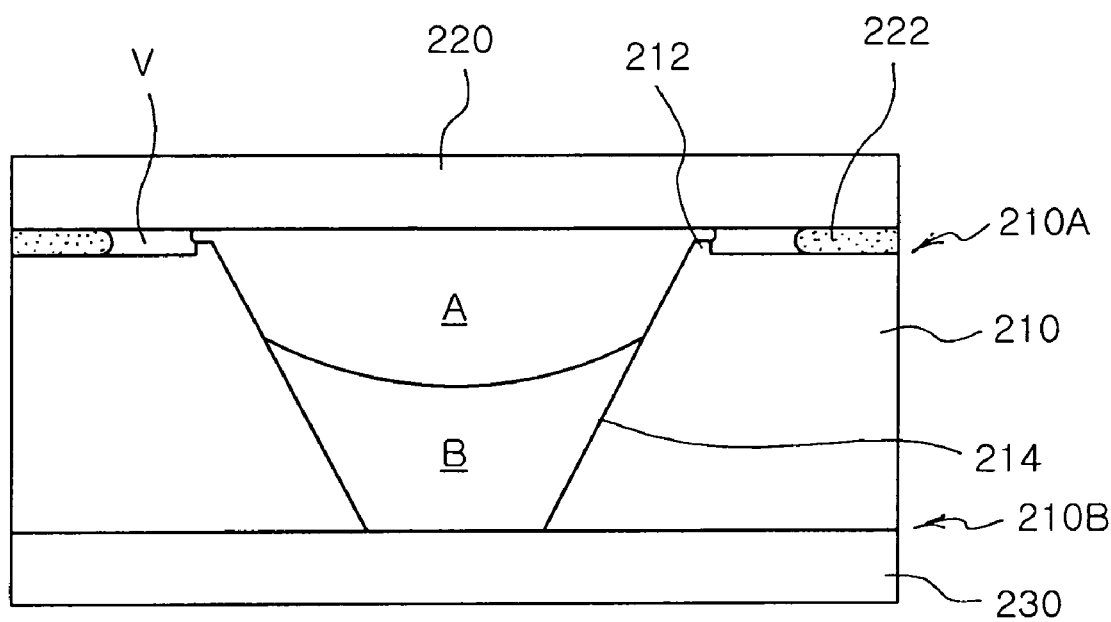
FIG. 6 is a cross-sectional view schematically illustrating a variable focus lens according to another embodiment of the invention.

Referring to FIG. 6, a variable focus lens 200 according to another embodiment of the invention is shown schematically.

In the variable focus lens 200 shown in FIG. 6, an inside surface 214 of a chamber wall 210 is inclined inward as it extends downward. This inclined configuration is applied to optimize the initial condition of the first and second fluids A and B, and the angle of inclination is variably applied according to the contact angle between the fluids A and B.

Except for this inclined configuration, the variable focus lens 200 of this embodiment has substantially the same construction as that shown in FIG. 5, which will not described repeatedly.

Figure 7:
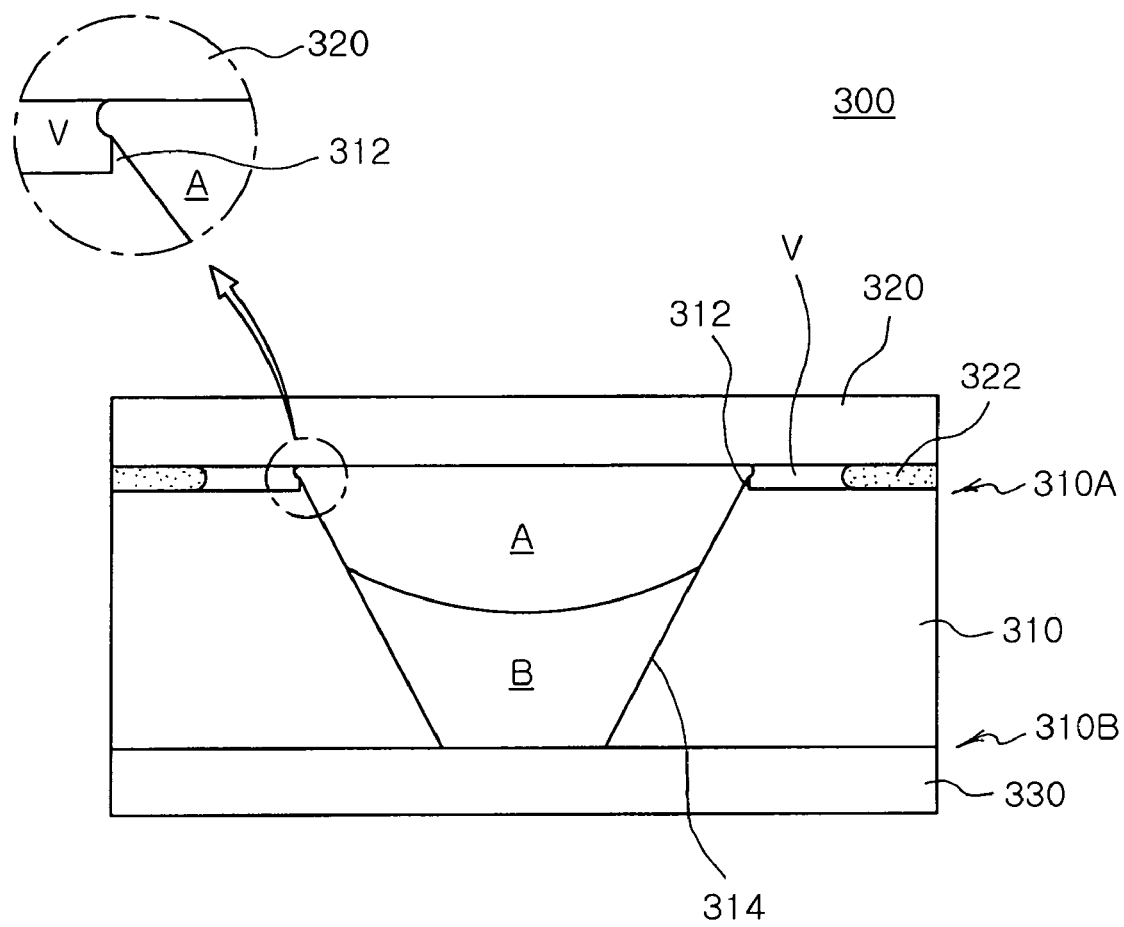
FIG. 7 is a cross-sectional view schematically illustrating a variable focus lens according to other embodiment of the invention.

Referring to FIG. 7, a variable focus lens 300 according to other embodiment of the invention is shown schematically.

In the variable focus lens 300, a protrusion 312 has a sharp tip, but other construction is substantially the same as that shown in FIG. 6. Of course, this sharply tipped protrusion 312 may also be adopted in the construction of FIG. 5.

Figure 8:
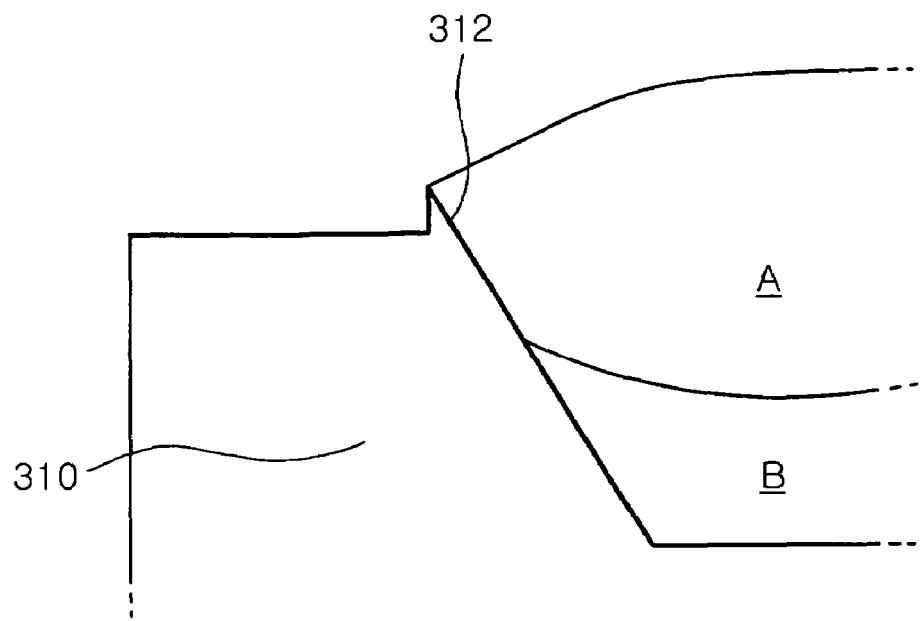
FIGS. 8 to 10 are cross-sectional views illustrating an interference type and its effect of the variable focus lens as shown in FIG. 7.
Figure 9:
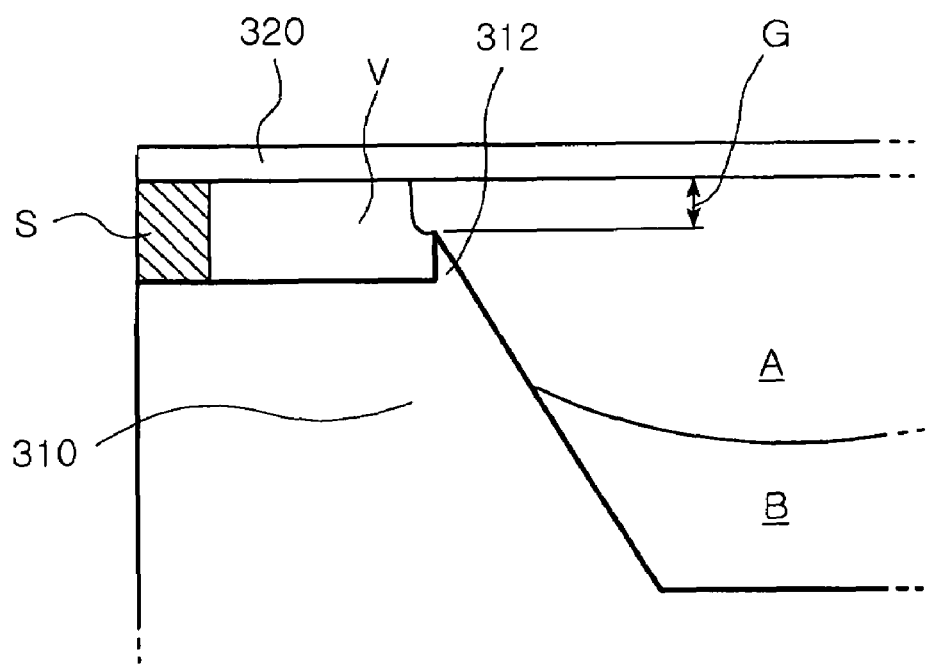
Figure 10:
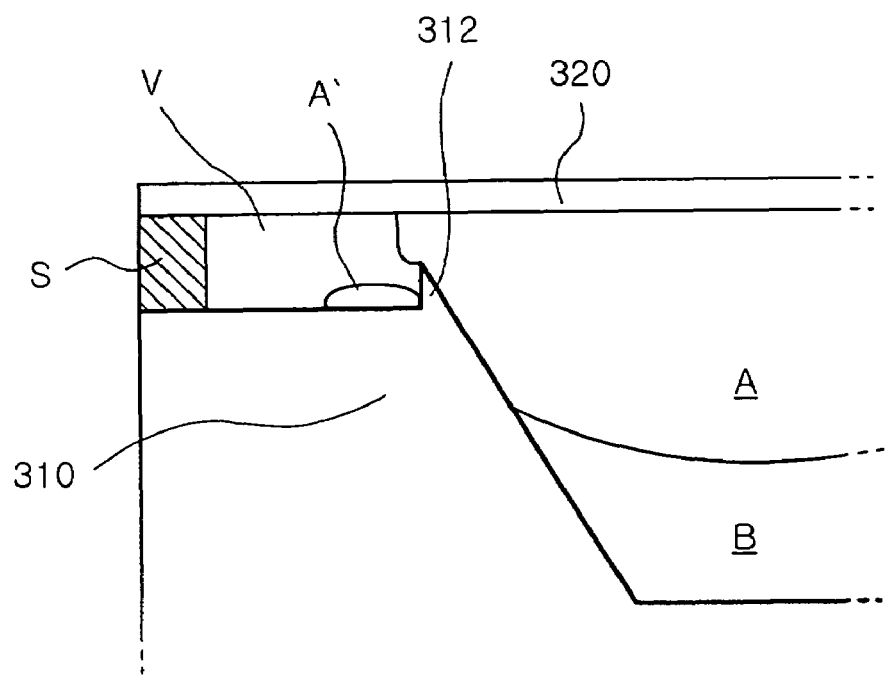

FIGS. 8 to 10 are cross-sectional views illustrating an interference type and its effect of the variable focus lens as shown in FIG. 7. While the reference is made to FIG. 7 for the sake of convenience, this illustration may be equally applied to those constructions shown in FIGS. 5 and 6.

First, when the fluid B and then fluid A are precisely injected into the chamber, the fluid A in an upper layer has a convexed shape over the protrusion 312. This convexed shape is exaggerated, but its dimension is slight since the quantity of the fluid A injected is controlled precisely.

When the upper transparent element 320 is moved down from above to couple with the chamber wall 310, the convexed portion of the fluid A first contacts the underside of the transparent element 320 and then is pressed thereby. The pressed portion of the fluid A is pushed outward or toward the protrusion 312, and thus forms a dew-like portion bulged from between the protrusion 312 and the upper transparent element 320 as shown in FIG. 9.

That is to say, the fluid A upon contacting the underside of the upper transparent element 320 spreads along the underside of the upper transparent element 320. When the spreading fluid A portion reaches the tip of the protrusion, the fluid A portion does not flow beyond the protrusion 312, but remains trapped in a convex dew-like shape between the protrusion 312 and the upper transparent element 320. This is realized by the force between the fluid A and the tip of the protrusion 312 (or surface tension). This force traps the fluid A between the protrusion 312 and the upper transparent element 320 when it is larger than the driving force making the fluid A to spread along the underside of the upper transparent element 320. This phenomenon can be understood similarly from a water drop that maintains its convex shape on a flat surface.

In case that the fluid A is injected too much and excessive fluid A' remains after filling up the space inside the protrusion 312, the excessive fluid A' overcomes the force between the protrusion 312 and the upper transparent element 320, thereby making itself drop out of the protrusion 312. As shown in FIG. 10, the excessive fluid A' remains between the protrusion 312 and a stopper S.

In order to realize such effects, the protrusion may have a width and a gap from the upper transparent element that can be adjusted variously as long as assembling of the variable focus lens does not create bubbles and the assembled variable focus lens can maintain its hermetic status while acting as a fluid lens.

In this fluid lens, the protrusion 312 preferably has a width of 300 μm or less. The gap G between the protrusion 312 and the upper transparent element 320 may be adjustable according to the quantity of fluid injection, and preferably 20 μm or less. The gap G may be adjusted by the stopper S, which may utilize the afore-mentioned sealing 322 or adopt different physical means.

Figure 11:
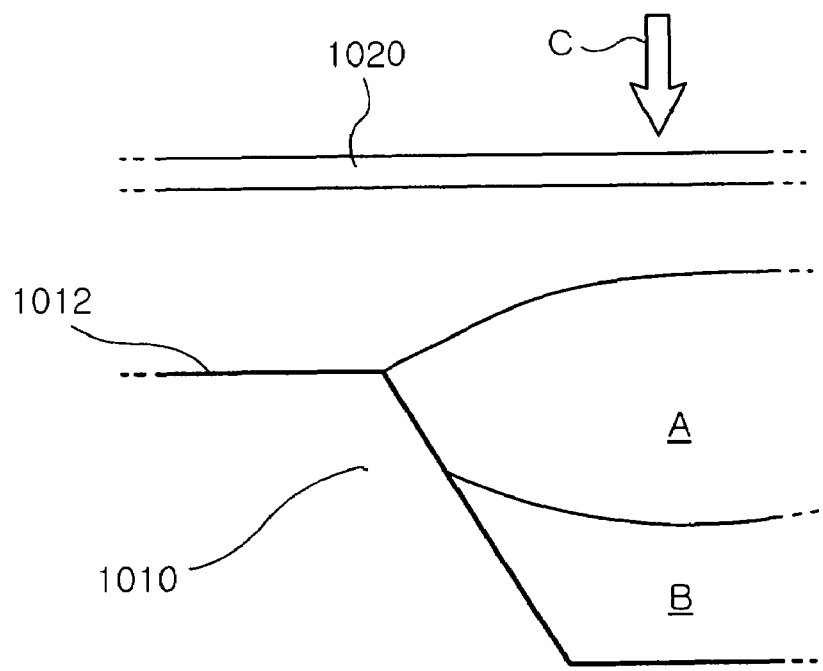
FIGS. 11 and 12 are cross-sectional views illustrating an interference type and its effect of a variable focus lens, in which a protrusion is not present or its width is too large.
Figure 12:
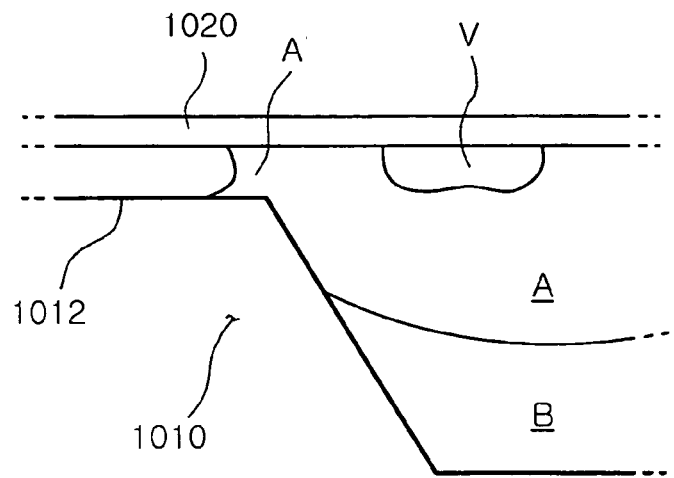

With reference to FIGS. 11 and 12, description will now be made of a situation where a protrusion is not present or its width is too large.

Figure 4:
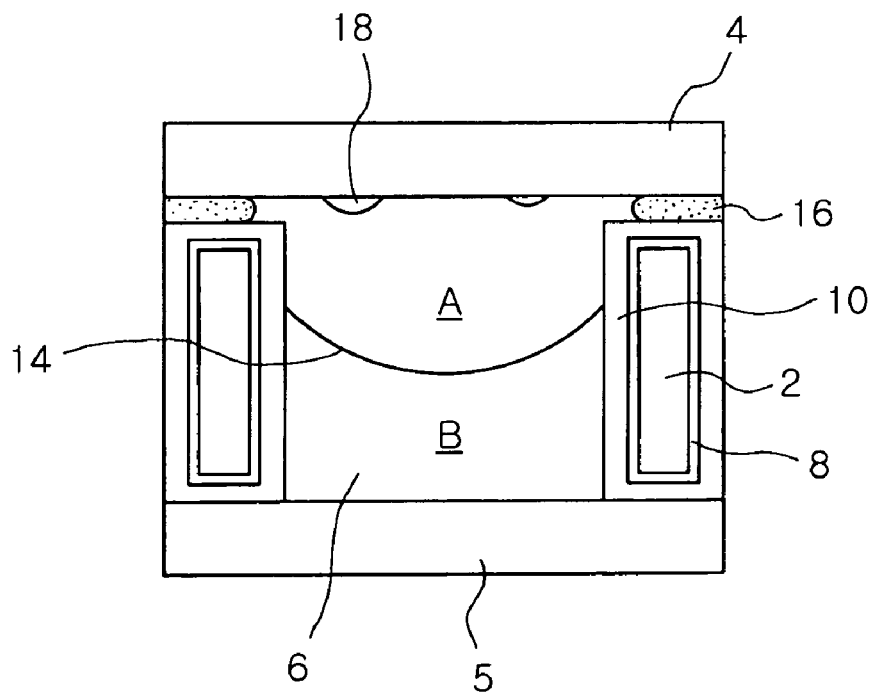
FIG. 4 is a cross-sectional view illustrating a drawback of the conventional variable focus lens.

First, as shown in FIG. 11, fluids A and B are filled into a space defined by a chamber wall 1010 without a protrusion into a convexed shape to the extent that the fluid B does not flow along the top 1012 of the chamber wall 1010. As an upper transparent element 320 is moved down from above, the fluid A contacts the underside of the transparent element 1020 and then spreads along the underside thereof. When the upper transparent element 1020 is completely coupled with the chamber wall 1010, a void V may be built up in the fluid A positioned in a middle portion of the upper transparent element 1020 as shown in FIG. 12. The void V makes the fluid lens useless. This problem is also similar to that described previously with reference to FIG. 4.

However, the protrusion of the invention can prevent such a problem. That is, when the fluid A reaches the tip of the protrusion 312 shown in FIG. 312, the fluid A does not spread as in FIG. 11 but remains between the protrusion 312 and the underside of the upper transparent element 320 under the force acting between the protrusion 312, thereby preventing the void V from forming. As a result, the variable focus lens of the invention can be easily fabricated in the air, and thus remarkably improving productivity.

Figure 13:
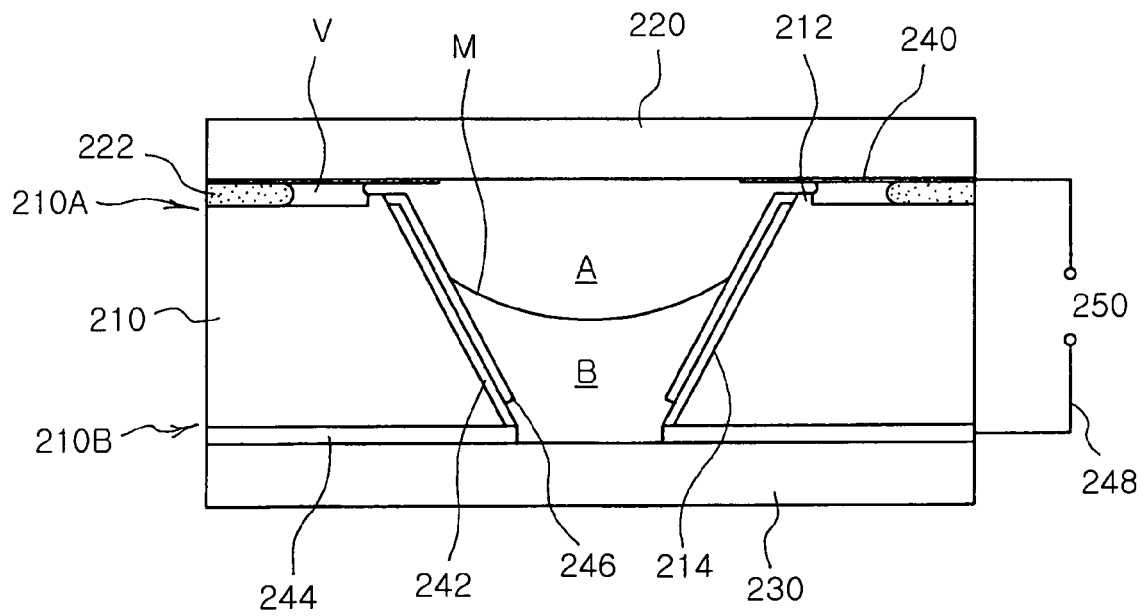
FIGS. 13 and 14 are cross-sectional views illustrating variable focus lenses as shown in FIG. 6, equipped with different types of electrodes.

FIG. 13 is a cross-sectional view illustrating a variable focus lens as shown in FIG. 6, equipped electrodes 240 and 242.

The variable focus lens 200 further includes the first electrode 240 formed on the underside of the upper transparent element 220, the second electrode 242 formed on the inside surface of the chamber wall 210 and an insulating layer 246 formed on the second electrode 242 to electrically insulate the first electrode 240 from the second electrode 242. In addition, a conductor 244 is formed between the bottom end 210B of the chamber wall 210 and the lower transparent element 230 to electrically connect the second electrode 242 with an external power supply 250.

In this case, the first fluid A becomes conductive, but the second fluid B becomes non-conductive. In addition, the chamber wall 210 is made of insulator such as glass and ceramic.

The power supply 250 together with electric wires 248 are provided so that the first electrode 240 is electrically connected with the power supply 250 via upper one of the electric wires 248 and the second electrode 242 is electrically connected with the power supply 250 via lower one of the electric wires 248.

Figure 1:
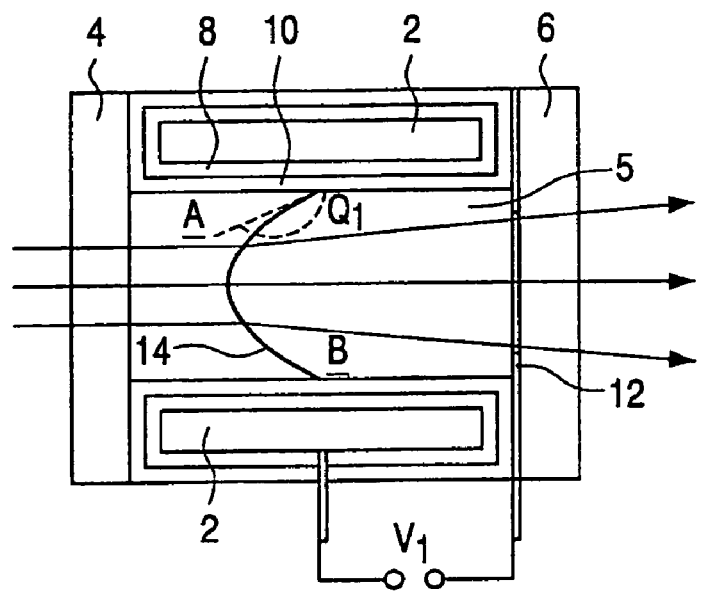
FIGS. 1 to 3 are cross-sectional views illustrating a conventional variable focus lens and its operation.
Figure 2:
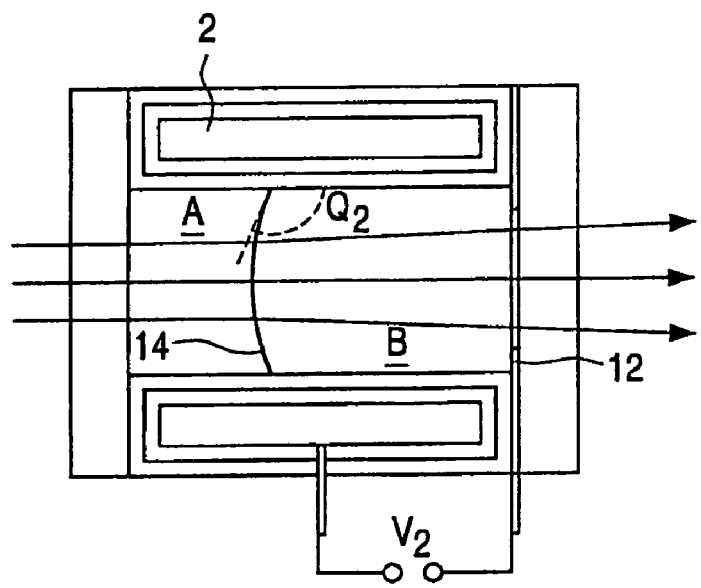
Figure 3:
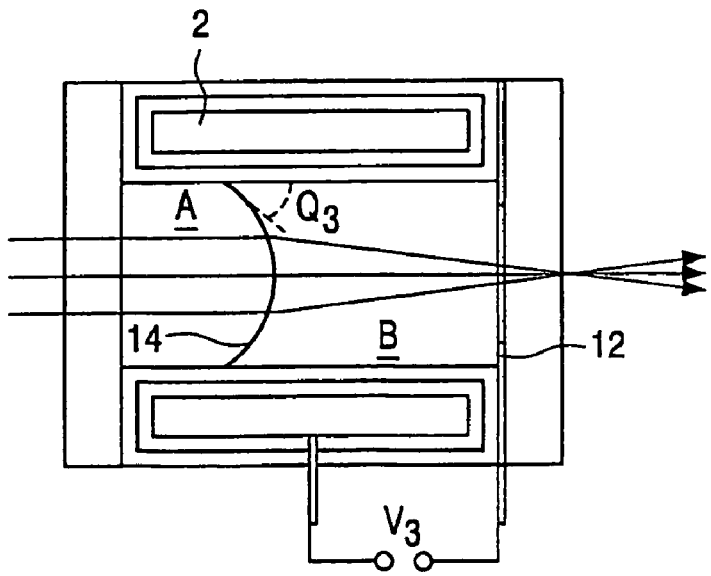

This changes the voltage from the power supply 250 as described with reference to FIGS. 1 to 3 to varying the meniscus M between the first and second fluids A and B, thereby adjusting the focal length of the variable focus lens 200.

In this case, the insulating layer 246 has to be formed to cover the second electrode 242 in a sufficient area so that the conductive first fluid A does not contact the second electrode 242 during the change of the meniscus M.

Preferably, the first and second electrodes 240 and 242 may be formed via deposition such as sputtering and electron beam deposition.

Figure 14:
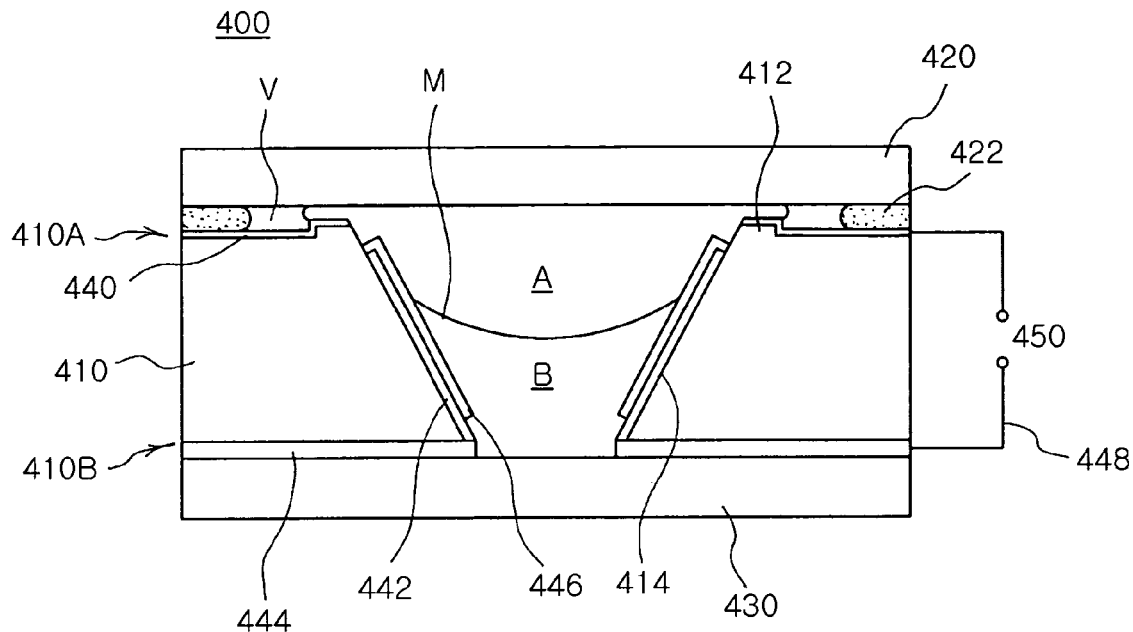

FIG. 14 is cross-sectional view illustrating variable focus lens as shown in FIG. 6, equipped another type of electrodes, in which components are designated with reference signs starting with 400.

The variable focus lens 400 shown in FIG. 14 further includes a first electrode 440 formed on the top end 410A of the chamber wall 410 including the protrusion 412 opposed to the upper transparent element, a second electrode 442 formed on the inside surface 414 of the chamber wall 410 and an insulating layer 446 formed on the second electrode 442 to electrically insulate the second electrode 442 from the first electrode 440.

Other components except for the first electrodes 440 are substantially the same as those in FIG. 13 and thus explanation thereof will be omitted.

Figure 15:
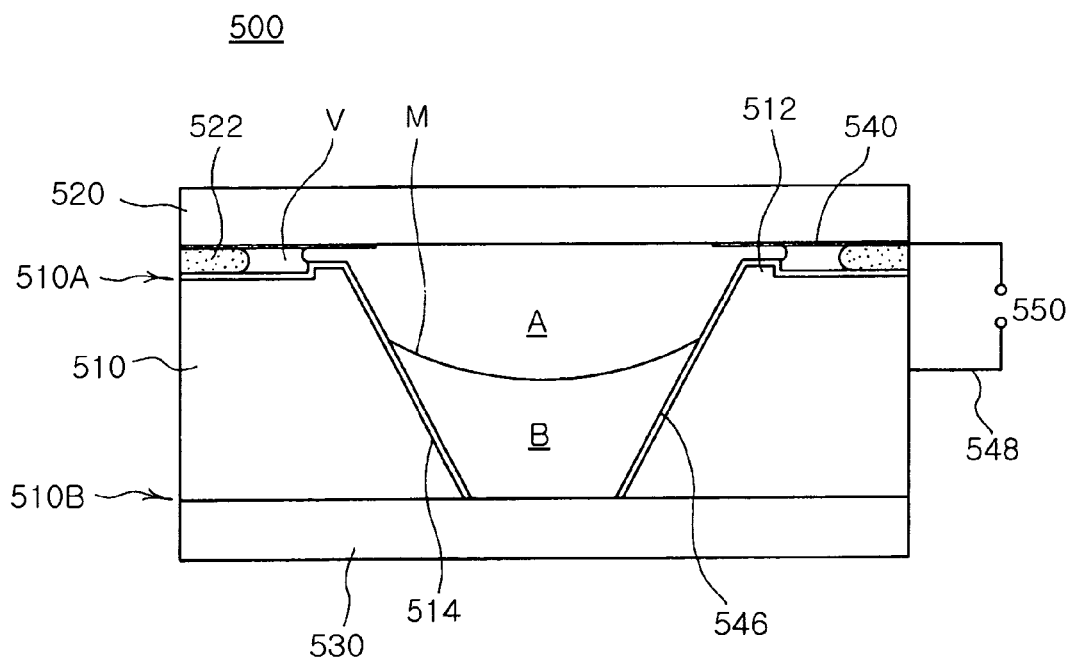
FIGS. 15 and 16 are cross-sectional views illustrating variable focus lenses as shown in FIG. 6, equipped with different types of electrodes, in which a chamber wall is made of a conductor to provide an electrode.

FIG. 15 is a cross-sectional view illustrating a variable focus lens as shown in FIG. 6, equipped with further another type of electrodes, in which a chamber wall is made of a conductor to provide an electrode. For the convenience's sake of illustration, all components are designated with reference signs starting with 500.

As shown in FIG. 15, the variable focus lens 500 of the invention further includes a first electrode 540 formed on the underside of the upper transparent element 520 and an insulating layer 546 formed on the inside surface 514 of the chamber wall 510 functioning as a second electrode in order to make electrical insulation between the first electrode 540 and the conductive chamber wall 510.

In this construction, the chamber wall 510 as the second electrode can be electrically connected to a power supply by means of an electric wire 548. As a result, the construction of the variable focus lens 500 is further simplified.

While the insulating layer 546 is shown extended to the bottom 510B of the chamber wall 510, the insulating layer may be formed to partially cover the inside surface 514 of the chamber wall 510 to the extent that the conductive first fluid A does not contact the chamber wall 510 acting as the second electrode in accordance with the change of the meniscus M.

Figure 16:
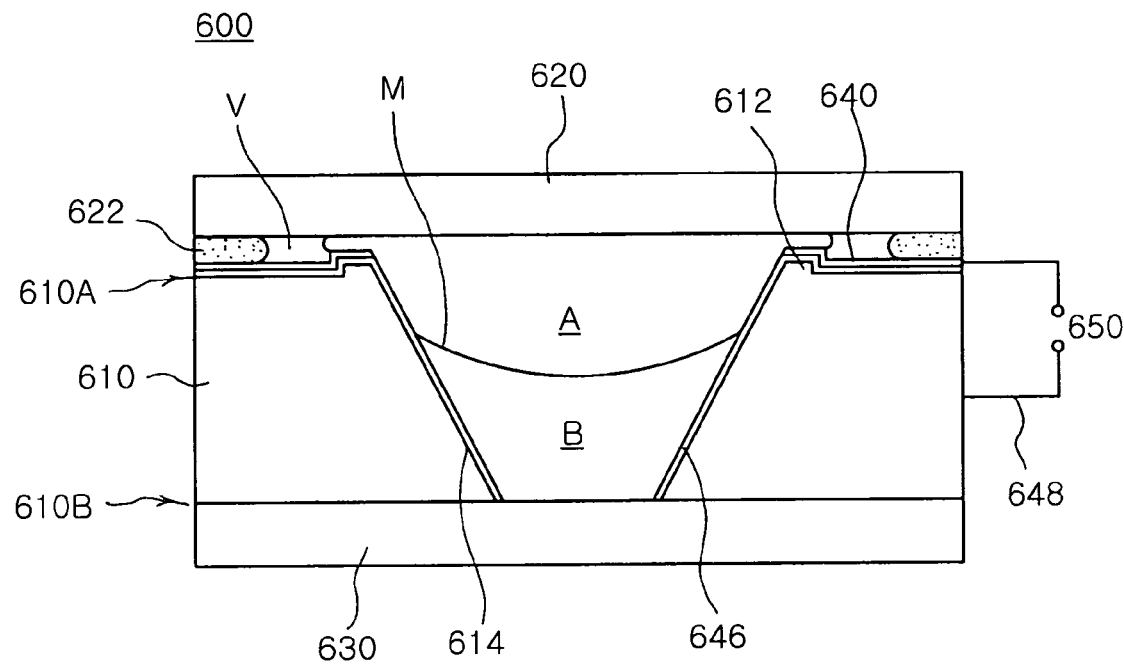

FIG. 16 is a cross-sectional view illustrating a variable focus lens as shown in FIG. 6, equipped with yet another type of electrodes, in which a chamber wall is made of a conductor to provide an electrode. For the convenience's sake of illustration, all components are designated with reference signs starting with 600.

As shown in FIG. 16, the variable focus lens 600 of this invention further includes a first electrode 640 formed on one end 610A of the chamber wall 610 including the protrusion 612 opposed to the upper transparent element 620 and an insulating layer 646 making electrical insulation between the first electrode 640 and the chamber wall 610 acting as a second electrode.

A portion of the insulating layer 646 is interposed between the chamber wall upper end 610A and the first electrode 640 to make electrical insulation therebetween and is covered on the inside surface 614 of the chamber wall 610 to prevent the first fluid A from contacting the chamber wall 610. While the insulating layer 646 is shown extended to the bottom 610B of the chamber wall 610, the insulating layer 646 may be formed to partially cover the inside surface 614 of the chamber wall 610 to the extent that the conductive first fluid A does not contact the chamber wall 610 acting as the second electrode in accordance with the change of the meniscus M.

Although the electrode arrangements mentioned above with reference to FIGS. 13 to 16 have been described as applied to the variable focus lens as shown in FIG. 7 for the sake of convenience, these arrangements can be equally applied to the variable focus lenses as shown in FIGS. 5 and 7.

Figure 17:
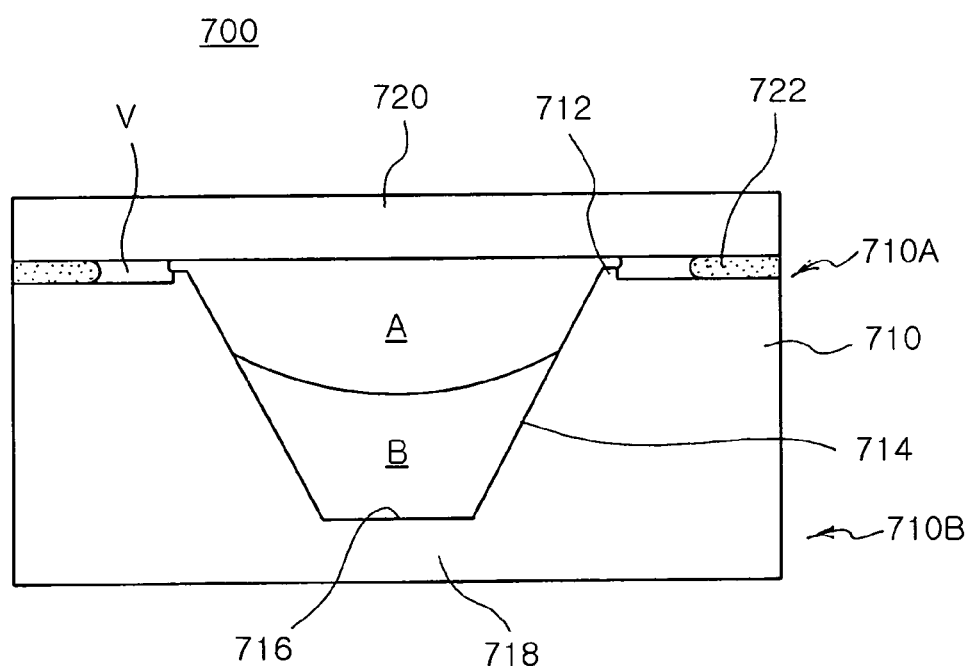
FIG. 17 is a cross-sectional view illustrating a variable focus lens according to further another embodiment of the invention.

FIG. 17 is a cross-sectional view schematically illustrating a variable focus lens according to further another embodiment of the invention.

As shown in FIG. 17, the variable focus lens 700 of this embodiment includes a chamber 710 having an opened upper end 710A with a bump or protrusion 712 formed along the upper end a closed lower end 710B. The variable focus lens 700 also includes a transparent element 720 coupled with the upper end 710A of the chamber 710 with a predetermined gap G from the protrusion 712.

The upper transparent element 720 and the chamber 710 are hermetically coupled by means of a sealing. The chamber 710 is made of a transparent material such as glass and transparent plastic so that a lower portion 718 of the chamber 710 acts as a lower transparent element. By integrating the lower transparent element to the chamber 710, it is possible to omit a process of bonding the lower transparent element to the chamber 710.

The inner space of the chamber defined by the chamber wall 710 and the upper and transparent element 720 is filled with first and second non-miscible fluids A and B. The first and second fluids A and B have a substantially equal density, but different refractive indices. Furthermore, one of the fluids is conductive but the other one is non-conductive. In general, the first fluid A is conductive whereas the second fluid B is non-conductive.

In this construction, the first fluid A forms a convex, dew-like portion bulged from between the protrusion 712 and the upper transparent element 720 but maintains tight or close contact with the upper transparent element 720 inside the protrusion 712. As a result, air or gas maintains in an area outside the protrusion 712, that is, a vacancy V between the protrusion 712 and the sealing 722, but not inside the protrusion 712.

The details and effects of the protrusion 712 are substantially the same as those in FIGS. 8 to 10, and thus they will not be described repeatedly.

Figure 18:
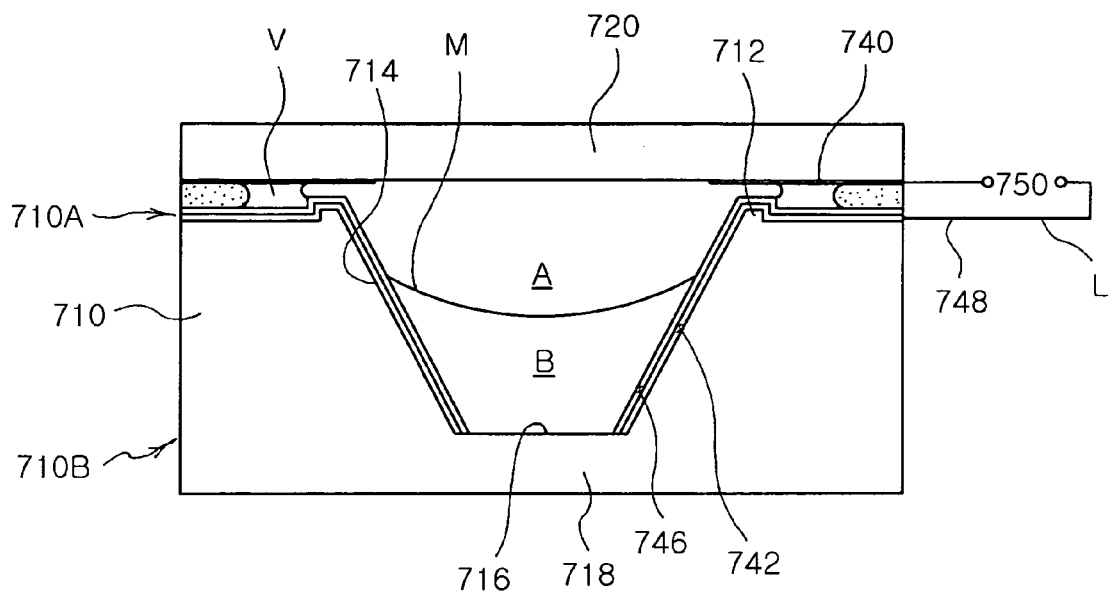
FIGS. 18 and 19 are cross-sectional views illustrating variable focus lenses as shown in FIG. 17, equipped with different types of electrodes.

FIG. 18 is a cross-sectional view illustrating a variable focus lens as shown in FIG. 17, equipped with electrodes.

As shown in FIG. 18, the variable focus lens 700 of the invention further includes a first electrode 740 formed on the underside of the upper transparent element 730, a second electrode 742 formed on the inside surface 714 of the chamber 710 and an insulating layer 746 formed on the second electrode 742 to electrically insulate the second electrode 742 from the first electrode 740.

In this case, the first fluid A is conductive, but the second fluid B is non-conductive.

In addition, a power supply 750 and wires 748 are provided so that the first electrode 740 is electrically connected with the power supply 750 via upper one of the wires 748 and the second electrode 742 is electrically connected with the power supply 750 via lower one of the wires 748.

While the insulating layer 746 is shown extended to the bottom 716 of the chamber 710, the insulating layer 746 may be formed to partially cover the inside surface 714 of the chamber wall 710 to the extent that the conductive first fluid A does not contact the chamber wall 710 acting as the second electrode in accordance with the change of the meniscus M.

Figure 19:
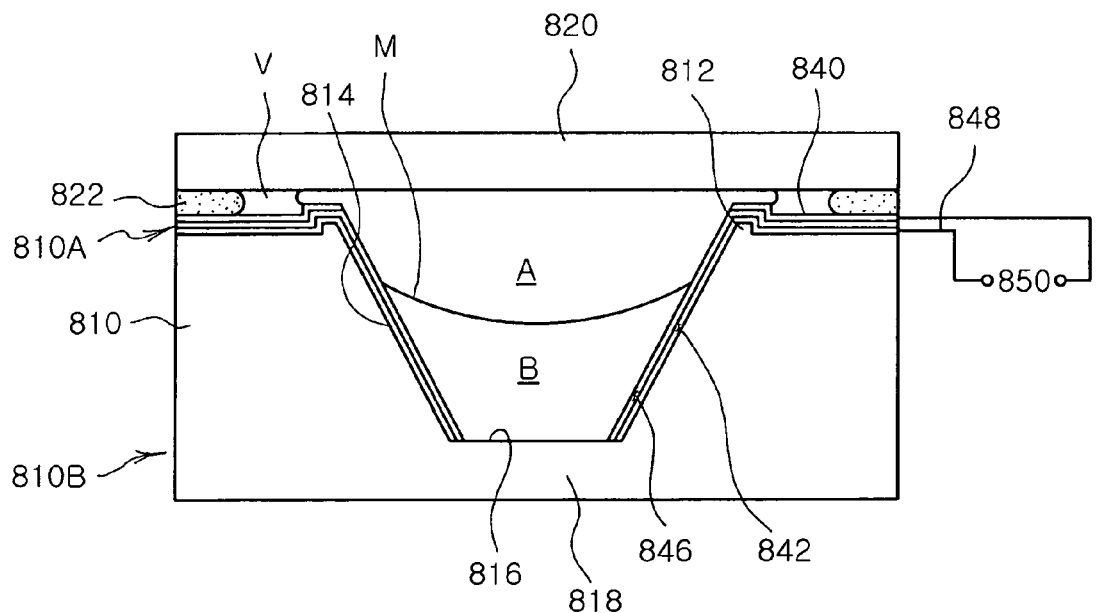

FIG. 19 is a cross-sectional view illustrating a variable focus lens as shown in FIG. 17, equipped with another type of electrodes. For the convenience's sake of illustration, all components are designated with reference signs starting with 800.

As shown in FIG. 19, the variable focus lens 800 of this embodiment includes a first electrode 840 formed on one upper end 810A of the chamber 810 including the protrusion 812 opposed to the upper transparent element 830, a second electrode 842 formed on the inside wall 814 of the chamber 810 and an insulating layer 846 formed on the second electrode 842 to electrically insulate the second electrode 842 from the first electrode 840.

Other components except for the first electrode 840 are substantially the same as those in FIG. 18, and thus explanation thereon will be omitted.

As described hereinbefore, the variable focus lens of the present invention is equipped with a protrusion along one end of a chamber, thereby preventing potential performance degradation owing to bubble formation. Furthermore, the variable focus lens of the invention can be fabricated in the air. Accordingly, the present invention can improve stability of the variable focus lens while facilitating its fabrication, thereby remarkably improving its productivity.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. A variable focus lens comprising:
    a fluid chamber having a protrusion with a sharp tip, the protrusion formed along one opened end thereof, the fluid chamber cylindrically shaped to house first and second non-miscible fluids therein, the first and second fluids having different refractive indices;
    a transparent element hermetically coupled with the opened end of the chamber with a predetermined gap from the protrusion of the chamber;
    a first electrode disposed inside the chamber to act on the first fluid; and
    a second electrode insulated from the first electrode.

2. The variable focus lens according to claim 1, further comprising a second transparent element hermetically coupled to the other end of the chamber.

3. The variable focus lens according to claim 1, wherein the chamber is made of transparent material, and has a closed end with a predetermined thickness opposed to the opened end.

4. The variable focus lens according to claim 1, wherein the first fluid is conductive and the second fluid is non-conductive.

* * * * *